(12) United States Patent
Lee et al.

(10) Patent No.: US 11,082,528 B2
(45) Date of Patent: Aug. 3, 2021

(54) NETWORK OPERATION SYSTEM AND METHOD

(71) Applicant: ELECTRONICS AND TELECOMMUNICATIONS RESEARCH INSTITUTE, Daejeon (KR)

(72) Inventors: Kyung Hyu Lee, Seoul (KR); Hea Sook Park, Daejeon (KR); Ki Won Kim, Daejeon (KR); Byeong Sik Kim, Daejeon (KR); Yoon Sik Yoo, Daejeon (KR); Jong Kuk Lee, Daejeon (KR); Hyung Kyu Lee, Daejeon (KR); Jin Hyuk Yim, Daejeon (KR); Ki Cheol Jeon, Daejeon (KR); Byung Chang Chung, Daejeon (KR); Boo Geum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/786,767

(22) Filed: Feb. 10, 2020

(65) Prior Publication Data
US 2020/0259924 A1    Aug. 13, 2020

(30) Foreign Application Priority Data
Feb. 11, 2019  (KR) .................... 10-2019-0015716

(51) Int. Cl.
*H04L 12/00* (2006.01)
*H04L 29/08* (2006.01)
*H04L 12/14* (2006.01)
*G06F 9/54* (2006.01)

(52) U.S. Cl.
CPC .............. *H04L 67/32* (2013.01); *G06F 9/547* (2013.01); *H04L 12/1407* (2013.01)

(58) Field of Classification Search
CPC .... H04L 67/32; H04L 12/1407; H04M 15/66; G06F 9/547; H04W 4/24
USPC ........................................................ 709/223
See application file for complete search history.

(56) References Cited

U.S. PATENT DOCUMENTS

| | | | | |
|---|---|---|---|---|
| 6,023,562 A * | 2/2000 | Baker | .................. | H04Q 3/0062 709/241 |
| 6,600,917 B1 * | 7/2003 | Maupin | .................. | H04W 48/16 455/414.1 |
| 6,985,901 B1 * | 1/2006 | Sachse | ................ | H04L 41/5032 |
| 8,234,382 B2 * | 7/2012 | Rasanen | ................ | H04W 28/16 709/227 |

(Continued)

FOREIGN PATENT DOCUMENTS

| | | |
|---|---|---|
| KR | 1020180087534 A | 8/2018 |
| KR | 1020180094580 A | 8/2018 |

*Primary Examiner* — Frantz Coby
(74) *Attorney, Agent, or Firm* — Rabin & Berdo, P.C.

(57) ABSTRACT

Provided is a matching system including a policy and rule processing unit configured to extract SC units for each application service required, combine the SC units, configure a transaction unit, and determine an amount to be charged for a transaction according to a charging rule; a matching processing unit configured to match the extracted SC units to NC units; and an NC combination processing unit configured to combine the NC units used for the matching and deliver the combination of the NC units and detailed operating conditions to the networking management system.

11 Claims, 6 Drawing Sheets

(56) References Cited

U.S. PATENT DOCUMENTS

| | | | | |
|---|---|---|---|---|
| 8,612,568 | B2* | 12/2013 | Tian | H04L 67/22 |
| | | | | 709/224 |
| 8,793,378 | B2* | 7/2014 | Allam | G06F 9/5072 |
| | | | | 709/226 |
| 9,178,586 | B2* | 11/2015 | Zhang | H04L 27/2647 |
| 9,432,221 | B2* | 8/2016 | Cili | H04L 25/0204 |
| 9,503,300 | B2* | 11/2016 | Ma | H04L 25/0244 |
| 9,548,977 | B2* | 1/2017 | Gabor | H04W 12/0609 |
| 9,900,399 | B2 | 2/2018 | Jeong et al. | |
| 10,200,227 | B2* | 2/2019 | Shattil | H04W 52/241 |
| 10,257,696 | B2* | 4/2019 | Patil | H04L 12/2834 |
| 10,298,448 | B2* | 5/2019 | Cartaya | H04L 41/0853 |
| 10,305,636 | B1* | 5/2019 | Shattil | H04J 13/004 |
| 10,554,675 | B2* | 2/2020 | Jain | H04L 63/20 |
| 10,659,378 | B2* | 5/2020 | Blumenthal | H04L 1/1858 |
| 10,840,978 | B2* | 11/2020 | Shattil | H04J 13/004 |
| 2015/0100696 | A1 | 4/2015 | Lee et al. | |

* cited by examiner

NETWORK OPERATION SYSTEM AND METHOD

CROSS-REFERENCE TO RELATED APPLICATION

This application claims priority to and the benefit of Korean Patent Application No. 2019-0015716 filed on Feb. 11, 2019, the disclosure of which is incorporated herein by reference in its entirety.

BACKGROUND

1. Field of the Invention

The present invention relates to a network operation system and method for a Multi-Media Multi-Path (MMMP) network.

2. Discussion of Related Art

With the development of communication technology, recently, connections are made among various wired and wireless networks such as Wideband Code Division Multiple Access (WCDMA) network, Long-Term Evolution (LTE) network, 5-Generation (5G) mobile communication network, wired Internet network, microwave network, and satellite network, and various communication services are being provided through all or some of the networks.

However, in the conventional network technology, a network provider constructs a network based on a predetermined network capability (NC) and provides wired and wireless communication services accordingly, and a service provider provides its service through a predetermined network. That is, the conventional networking scheme is dependent on network resources that are physically or logically determined.

The conventional technology is insufficient to accommodate various service types corresponding to a hyper-network service in near future and thus cannot flexibly keep up with various needs regarding a network construction cost, a time to introduce the service, and a user's requirements, etc.

Recently, service fields utilizing information and communication technologies (ICT) are being diversified, and service requirements such as trust, security, and real-time are becoming complicated. Thus, advances in networking infrastructure control technology are required.

In particular, in terms of a hyper-network business ecosystem where net neutrality and differentiation have to be compatible, there is a need for an innovative networking control and management technique capable of coping with various environmental changes, by performing NC servitization through the cooperation of a network service provider (NSP), a cloud Internet service provider (CISP), and a user service provider (USP) or an application service provider (ASP) including an individual provider.

In addition, there is also a need for a technique that performs control such that a user determines a network connection level for each NC unit (bandwidth, safety, security, etc.) in wired and wireless networking ranging from wired or wireless terminals and an Internet of Things (IoT) terminal to a cloud server.

Also, there is a need for a technique for controlling operations by forming an appropriate control channel for a network apparatus including a terminal agent, a control gateway, and a management server in a software-defined network (SDN).

In summary, there is an urgent need for a technique that defines and controls network in MMMP network infrastructure according to application services to be provided.

SUMMARY OF THE INVENTION

The present invention is directed to providing a networking capability (NC) defining method and system between a network provider and a service provider to construct a service network conforming to an NC required by application services of the service provider.

That is, the present invention is intended to present a service network construction technique that controls the NC of a network infrastructure on the basis of a service capability (SC) required by several application services in a hyper-network environment.

Also, by presenting a apparatus and system for controlling service network, it is possible to quickly control the NC depending on the application services.

According to an aspect of the present invention, there is provided a matching system that sends a network control instruction to a Multi-Media Multi-Path (MMMP) networking management system for managing heterogeneous networks in an integrated manner and that associates multiple service capabilities (SCs) to multiple network capabilities (NCs), including a policy and rule processing unit configured to extract SC units for each application service required, combine the SC units, configure a transaction unit, and determine an amount to be charged for a transaction according to a charging rule; a matching processing unit configured to match the extracted SC units to NC units; and an NC combination processing unit configured to combine the NC units matched and deliver the combination of the NC units and operating conditions to the networking management system.

The policy and rule processing unit analyze a required application service and extract at least one of a time-dependent SC (SC1), a bandwidth-dependent SC (SC2), a safe delivery SC (SC3), a zone-dependent SC (SC4), a group SC (SC5), and a media quality SC (SC6) and, if necessary, expand the SC units by adding a new SC to pre-defined SCs.

The matching processing unit may match at least one of an optimal path selection NC (NC1), a load distribution NC (NC2), an alternative path selection NC (NC3), a security-specific multi-media distribution and delivery NC (NC4), and a policy-specified NC (NC5) to each of the extracted SC units.

The matching system may further include a trading matching database configured to store a transaction unit table for which a transaction unit is set by matching the SCs to the NCs.

The transaction unit may include a basic transaction unit in which one SC and one NC are matched on a one-to-one basis, a multi-transaction unit which includes links of two or more basic transaction units and in which multiple SCs and multiple NCs are matched, and an overall transaction unit which includes two or more multi-transaction units.

The MMMP networking management system includes an MMMP agent apparatus configured to perform network control to wired/wireless terminal and Internet of Things (IoT) terminal; and an MMMP management server configured to receive a network operating condition from the NC combination processing unit through an API communication scheme, control a terminal-side gateway through a control channel to control a network operation between a terminal side and a server side, and control a server-side gateway through a control channel and a backup control channel.

According to another aspect of the present invention, there is provided a network operation method including extracting service capability (SC) units for each application service required, matching NCs required for the SCs to the SCs, and generating a transaction unit in which the SCs and the NCs are matched.

The generating of a transaction unit may include matching the SCs and the NCs on a one-to-one basis and generating transaction information for an NC transaction, and the transaction information may include a requestor (A) of SC1, an owner (B) of NC1, a transaction value between A and B (charging or any frequency, measure or the like to measure the charging), an operation start time and an operation end time of an NC, and a transaction operation stop flag.

According to still another aspect of the present invention, there is a network capability (NC) trading control method for terminal-to-terminal group networking, the NC trading control method including receiving a connection authorization request of a terminal to form a group, requesting matching of a service capability (SC) to be applied to an authorized terminal group and a network capability (NC) corresponding to the SC, generating a matching logic table in response to the request and delivering an NC combination and operating conditions to a networking management system, and switching a trading control link of the matching logic table to an active mode in response to a request for NC trading activation and sending an NC control request to the networking management system.

DETAILED DESCRIPTION OF EXEMPLARY EMBODIMENTS

Advantages and features of the present invention and methods for achieving them will be made clear from embodiments described below in detail with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims.

Meanwhile, terms used herein are for the purpose of describing embodiments only and are not intended to limit the present invention. As used herein, the singular forms are intended to include the plural forms as well unless the context clearly indicates otherwise. The terms "comprise" and/or "comprising" used herein indicate the presence of stated elements, steps, operations, and/or devices and do not preclude the presence or addition of one or more other elements, steps, operations, and/or devices.

Unless otherwise defined, all terms (including technical and scientific terms) used herein have the same meaning as commonly understood by those of ordinary skill in the technical field to which the present invention pertains.

Meanwhile, when an embodiment may be implemented in a different way, a function or operation specified in a specific block may be performed differently from the flow specified in a flowchart. For example, two consecutive blocks may actually be performed at substantially the same time or may be performed in reverse order according to the relevant function or operation.

The basic technical spirit of the present invention is to derive and prepare network capability units and service capability (SC) units required in various application services in hyper-networking environments, define SCs required for each specific application service, and control network infrastructure on the basis of network capability (NC) matched to the defined SC.

Figure 1A:
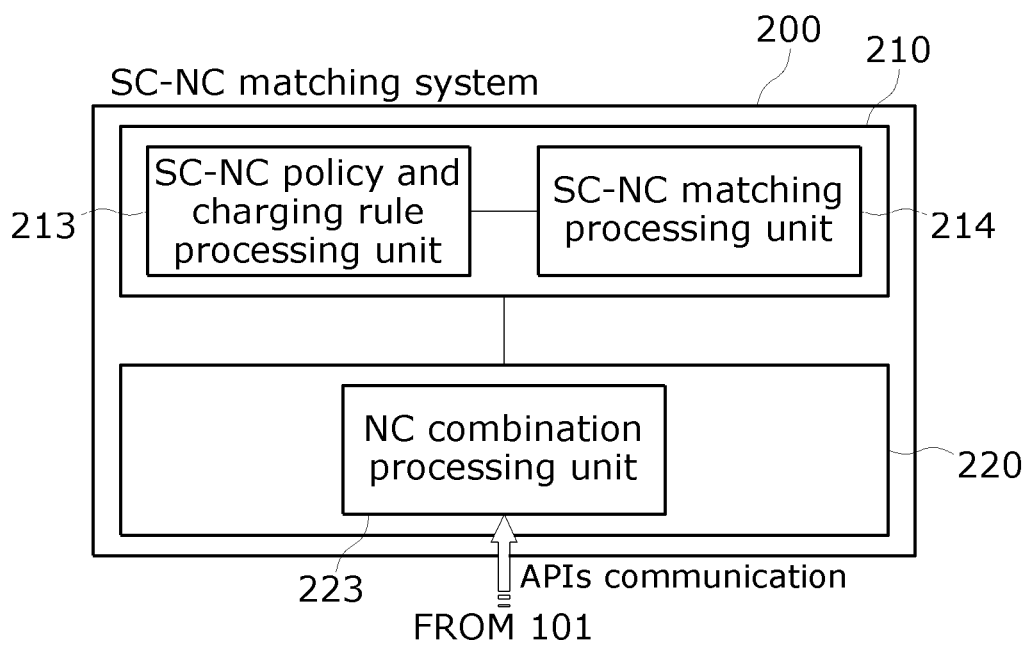
FIG. 1a and FIG. 1b are conceptual diagram of a Multi-Media Multi-Path (MMMP) networking management system and a multi-service capability (SC) and multi-network capability (NC) matching system according to the present invention.
Figure 1B:
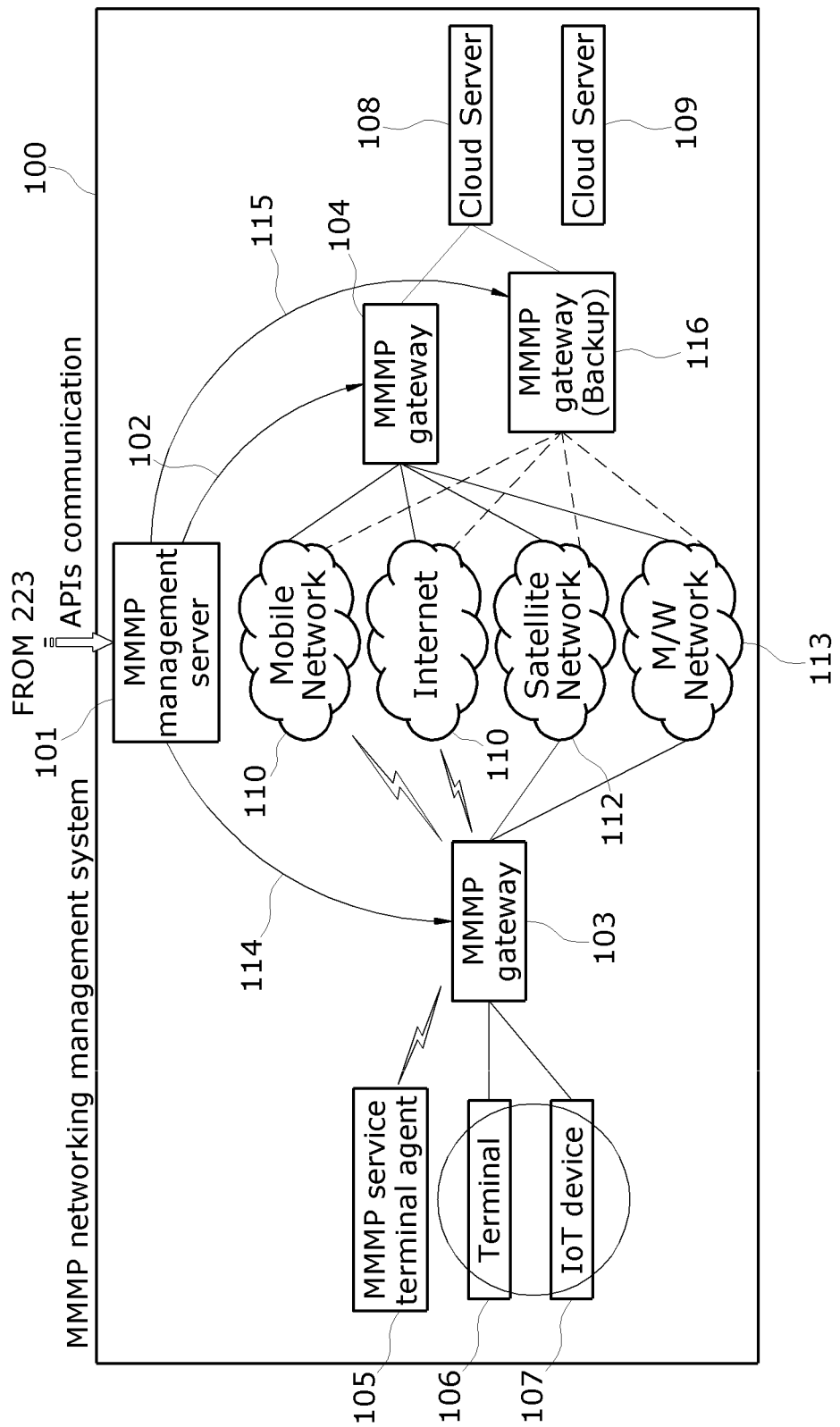

The overall concept and configuration of network infrastructure operation according to the present invention will be described below with reference to FIG. 1a and FIG. 1b.

From an overall perspective, the network infrastructure operation according to the present invention is performed by a Multi-Media Multi-Path (MMMP) networking management system (hereinafter abbreviated as a "networking management system") 100 and a system for matching multiple SCs to multiple NCs (hereinafter abbreviated as a "matching system") 200.

The matching system 200 derives multiple SCs in consideration of an application service and the characteristics of the networking infrastructure and matches the derived multiple SCs to multiple NCs. In this case, in order to provide NCs required to execute the corresponding application service on the basis of the matching, the networking management system 100 may perform MMMP networking for connecting multiple media through multiple paths.

The example types of the NC processed by the networking management system 100 include an optimal path selection NC (NC1), a load balancing NC (NC2), an alternative path selection NC (NC3), a security-ensured multi-media delivery NC (NC4), and a policy designation NC (NC5).

As described above, a plurality of NCs performed by the networking management system 100 are objectized and then processed in cooperation with an NC combination processing unit in NC processing sever 220 of the matching system 200. In detail, the NC combination processing unit 223 combines the objectized NCs, delivers the combinations and operating conditions of the NCs through application program interfaces (APIs) to the networking management system 100, and then the networking management system 100 performs NC processing.

Elements of the networking management system 100 for performing NC processing include an MMMP service terminal agent apparatus 105, an MMMP management server 101, and a wired or wireless network.

The MMMP service terminal agent apparatus 105 performs terminal networking control for group networking of wired or wireless terminal 106 or Internet of Things (IoT) terminal 107. The MMMP service terminal agent apparatus 105 serves to perform configuration control such that NCs are delivered to all the terminals.

The MMMP management server 101 may instruct a terminal side apparatus 105, 106, 107 and a cloud servers 108, 109 to control NCs. The MMMP management server 101 delivers a control instruction to the terminal side apparatus 105, 106, and 107 through control channels 114 and a terminal-side gateway 103 and delivers a control instruction through a control channel 102—gateway 104 and back-up control channel 115—back-up gateway 116.

The wired or wireless network may include Long-Term Evolution (LTE) network 110, Internet network 111, satellite network 112, and microwave (M/W) network 113 and may be expanded or reduced.

The MMMP management server 101 performs overall control management of the networking management system 100 and performs communication with the matching system 200 through an API communication scheme.

The matching system 200 includes a matching server 210 and an NC management server 220. The matching server 210 includes an SC-NC policy and charging rule processing unit 213 and an SC-NC matching logic processing unit 214, and the NC management server 220 includes an NC combination processing unit 223.

The SC-NC policy and charging rule processing unit 213 extracts SC units required for certain application service, combines the SC units, and determines usage fee of NCs matched with the extracted SC according to the charging rule.

The SC-NC matching logic processing unit 214 matches the extracted SC units with NC units. The SC units and NC units will be described below in detail.

The NC combination processing unit 223 combines the NC units used for the matching and delivers the combination of the NC units and detailed operating conditions to the networking management system 100.

Figure 2:
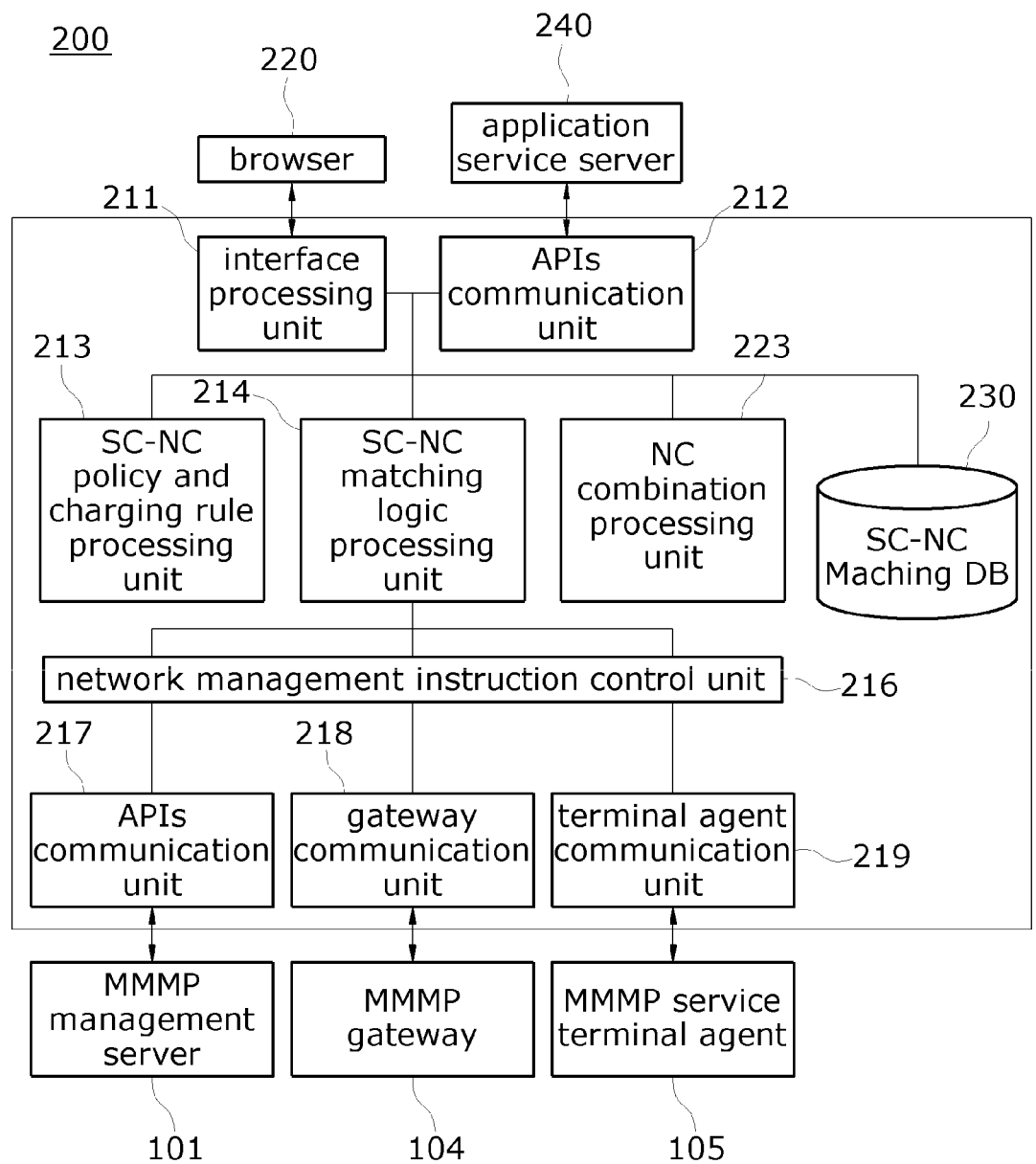
FIG. 2 is a block diagram of an SC-NC matching system that matches an SC to an NC and processes charging for NC use according to an embodiment of the present invention.

In the above-described embodiment, it has been described that the SC-NC policy and charging rule processing unit 213 and the SC-NC matching logic processing unit 214 are located in one server 210 and that the NC combination processing unit 223 is located in another server 220. However, this is merely an example. As shown in FIG. 2, it will be appreciated that the SC-NC policy and charging rule processing unit 213, the SC-NC matching logic processing unit 214, and the NC combination processing unit 223 may be located in one server computer system 200. Or these units 213, 214, 223 may be distributed in three or more servers.

At the level of a network ecosystem, the parties which utilize the matching system 200 will be additionally described as follows.

The owner or manager of the networking management system 100 may be a communication network provider, a virtual network provider, a local government, a private network provider, or the like.

The owner or manager of the matching system 200 may also include a cloud provider who performs a service in association with a network provider, an owner of a large enterprise network for a specific purpose, or a specific application service provider.

A cloud provider may own only the NC combination processing unit 223, and a specific application service provider may own or manage the SC-NC policy and rule processing unit 213 and the SC-NC matching logic processing unit 214.

The SC and NC will be described below in detail.

The SC units managed by the SC-NC matching logic processing unit 213 according to an embodiment of the present invention includes a time-dependent SC (SC1), a bandwidth-dependent SC (SC2), a safe delivery SC (SC3), a zone-dependent SC (SC4), a group SC (SC5), a media quality SC (SC6) and may be additionally expanded if necessary.

The time-dependent SC (SC1) is a capability unit for necessarily performing a service in real-time or within a predetermined time. The variables of the time-dependent SC (SC1) include start time, end time, delay time, and time-dependent operation.

The bandwidth-dependent SC (SC2) is a capability unit for performing a media transmission service with a specified bandwidth.

The safe delivery SC (SC3) is a reliable SC unit that delivers information most safely regardless of the amount of data.

The zone-dependent SC (SC4) is an SC unit that allows terminals which are located in a specific region to control a necessary NC. The zone-dependent SC (SC4) is useful in the same location category, such as an in-house intra-enterprise service or a location-based multimedia broadcast service.

The group SC (SC5) is an SC for assigning an NC to only a group of terminals satisfying a specific condition among all terminals to be serviced.

The multimedia quality SC (SC6) is an SC that guarantees that quality is higher than or equal to a level specified for each medial quality unit (e.g., voice quality, image quality, etc.).

The SC units may be appropriately added or reduced as necessary (SC-n).

Meanwhile, the NC units will be described in detail as follows.

The NC units of the NC combination processing unit 223 according to an embodiment of the present invention include optimal path selection NC (NC1), load distribution NC (NC2), alternative path selection NC (NC3), security ensured multi-media delivery NC (NC4), and policy designation NC (NC5).

The optimal path selection NC (NC1) is a capability to derive an optimal networking path in consideration of a current networking traffic situation, a predicted traffic situation, and the characteristics of media (video, audio, data, etc.) to be transmitted.

The load distribution NC (NC2) is a capability to recognize a traffic situation and distribute load into two or more paths.

The alternative path selection NC (NC3) is a capability to select an alternative path among various networks such as wireless or wired Internet or satellites are interoperable, when any path fails to exhibit a required delivery capability.

The security-ensured multi-media delivery NC (NC4) is a capability to deliver security-critical media. It may use several paths not through one network but in a distributed manner and is used for special-purpose networking domains (finance, national defense, disaster, etc.)

The policy-designated NC (NC5) is a capability to specify a policy for each user/use/purpose of the multiple media to be transmitted and enforce networking operation regulations in consideration of the specified policy. Special purpose networking requires a mechanism to perform the various NCs listed above in consideration of varying policies and rules in real-time. The NC units may be appropriately added or reduced as necessary The NC units may be combined by the NC combination processing unit 223.

In a preferred embodiment of the present invention, the policy and charging rule processing unit 214 performs to derive SCs (SC1-SCn) for providing an application service among above described SCs and combine derived SCs and performs charging processing for each combination (including no charge). A rule negotiated by a network provider 301, a cloud provider 301, and an application service provider 302 is considered.

The NC combination processing unit 223 has a configuration capable of combining multiple NCs and operates in a structure that may be expanded or reduced according to system performance of the NC processing system 100 in order to cope with network traffic situations.

FIG. 2 shows a configuration of the matching system 200 according to another embodiment of the present invention. In the present embodiment, the system is illustrated as being implemented as one server. It will be appreciated that the system may be implemented as a plurality of servers as described above.

According to a request from the application service server 240 that requires multiple SC units (SC1, SC2, . . . , SCn), the matching system 200 matches NCs (NC1 to NC5) to the required SC units, delivers a combination of the matched NCs, and sends a corresponding network management request to the networking management system 100.

A manager interface processing unit 211 provides an interface with a browser 220 used by a manager of the matching system 200.

Figure 3:
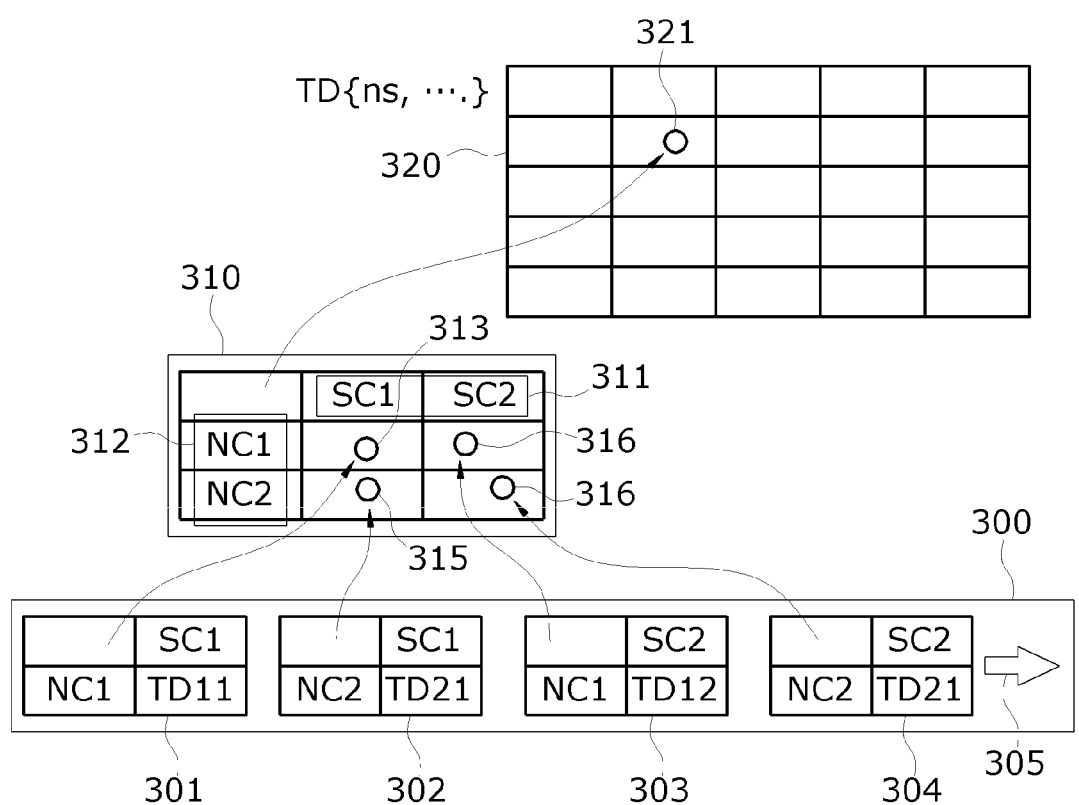
FIG. 3 is a diagram showing matching logic table for matching between multi-SC and multi-NC according to the present invention.

The browser 220 displays matching logic between an SC and an NC shown in FIG. 3 in real-time. The browser 220 displays charging statistics corresponding to SC unit transaction statistics. When NCs are added or expanded through the browser 220, the manager may adjust SCs to be expanded.

The SC-NC policy and charging rule processing unit 213 performs to derive SCs required for certain application service, combine the derived SCs, and determine charges in consideration of contract policies, charging schemes, and the like of an application service provider and a networking provider that provides NCs.

The SC-NC matching logic processing unit 214 forms a matching logic table according to the mechanism illustrated in FIG. 3 for matching NCs with SCs and stores the matching logic table in an SC-NC trading matching database 230.

The NC combination processing unit 223 optimizes an NC combination matched to an SC and delivers the optimized NC combination to a network management instruction control unit 216.

Conditions for executing multiple NCs are collectively combined by the network management instruction control unit 216 and delivered to a management server of the networking management system 100 by a multi-NC operation control API communication unit 217.

The NC combination processing unit 223 may communicate directly with service gateway 104 using service gateway communication unit 218, and delivers the NCs to a service terminal agent 105 using service terminal agent communication unit 219.

The MMMP management server 101 serving as a gateway of the networking management system 100 manages both of a wired/wireless network and a communication device to perform required NC units for each application services. Meanwhile, since performing the NC units have to be synchronized with corresponding SC, the multi-NC operation control API communication unit 217 and an SC unit transaction API communication unit 212 are synchronized with the SC-NC trading matching database 230 in the matching system 200.

The way of combining, matching, and performing trading control of an SC and an NC will be described below in detail with reference to FIG. 3.

The term "trading" is used in the following description to express that, in a series of processes of matching a specific SC to a specific NC and performing charging, a service provider pays a network charge for an NC provided by the network provider in return for a demand for the corresponding SC. Also, aberration "TD" in FIG. 3 means transaction unit and is derived from the term "Trading".

The most basic matching is 1:1 matching. For example, NC1 is operated when SC1 is required, and this is illustrated as the category 300 of FIG. 3. Transaction information stored in a basic transaction unit TD11 in an exemplary basic structure SC1:NC1 301 includes a requestor (A) of SC1, an owner (B) of NC1, a transaction value (charging or any measure or the like to measure the charging, etc.) between A and B, an operation start time and an operation end time of an NC, a transaction operation stop flag, and the like. The basic transaction units 301, 302, 303, 304, and 305 form and maintained with the same information structure.

Table 1 below shows transaction information stored in each basic transaction unit TD field.

TABLE 1

Contract ID between SC Supplier and NC Provider
SC-NC Policy and Charging Rule Profile Link ID
Start Time and End Time of Trading Operation
Charging Information (Initial Basic Unit, Multiple
Charging Arrangements)
Trading On-Off Flag
NC Operation ON-OFF Flag
Other Expansion-Related Information Multiple transactions are linked and processed in the following structure on the basis of the above-described basic transaction unit TD 300 of one-to-one matching between the SC and the NC.

For example, a 2×2-unit (SC1 and SC2, and NC1 and NC2) transaction of an SC and an NC maintains basic unit links 313, 314, 315, and 316 and further include changed trading condition due to expanded transaction 310, because trading condition (charging rate or the like) between A and B may be changed to be suitable for expanded transaction and be set differently with the sum of each basic transaction unit.

This allows trading conditions or the like to be regulated due to the expansion of the trading unit, satisfies an optimal trading condition between A and B, who are transaction partners, and reflects a mechanism for maximizing expansive supply of NCs due to expansive demand for SCs.

As a result, a maximum transaction unit 320 and its associated information are processed by regulating supply and demand while changing a basic unit transaction condition of a linked final lower end.

Such a scheme will be described with reference to a specific service embodiment as follows.

For example, it is assumed that a user wants a service to listen to a music broadcast from 9 pm to 10 pm. Also, it is assumed that the music broadcasting service is the most important service for the user in this time period.

The example service is basically a service for a specified time. And since music service should be continued without interruption, sufficient bandwidth (for safe delivery and quality assurance criteria) should be guaranteed. An SC unit combination required for such a service is SC 311(SC1+ SC2), which is for delivering a bandwidth specified within a specified time, according to a logic preset for the policy and rule processing unit 214. An NC unit combination that satisfies the SC unit combination SC1+SC2 311 is NC 312(NC1+NC2), which is obtained through an optimal path and load distribution, according to the logic of the SC-NC matching logic processing unit 214.

It will be appreciated that, in consideration of the processing capability or scheme of the networking management system 100, the matching logic and combination of the SC-NC matching logic processing unit 214 and/or the SC-NC policy and charging rule processing unit 213 may be configured differently.

The example of the basic trading unit is a one-to-one matching unit 301 between an SC and an NC, which may be expanded to a multi-transaction unit 310. When a trading logic combination unit is expanded to a transaction unit for all SCs needed for a service, an overall trading logic structure scale 320 and control and charging processing information 321 are formed. The overall trading logic table operates while dynamically changing during the service, that is, in a service life cycle and a networking life cycle.

Subsequently, charging adjustment by a transaction unit will be described in detail as follows.

Basic matching between basic NC units and SC units such as the proposed basic units, that is, a service condition transaction 301 for optimal path selection in a specific time period, a service condition transaction 302 for load distribution and delivery required in a specific time period, a service condition transaction 303 for selecting an optimal path with a specific bandwidth, a service condition transaction 304 for load distribution according to bandwidth classification, etc. may be configured. Also, a transaction charging unit may be configured while expanding the matching.

The logic of the transaction units of multiple SCs and multiple NCs expands from the basic transaction units 300. And each basic transaction units 301, 302, 303 and 304 being linked to one another in rows and columns on the multi-transaction matching logic table 310. Here, when multiple transactions are formed, a transaction charging unit may be adjusted.

A 2×2 transaction unit 310, which is a transaction unit between "SC1 and SC2" and "NC1 and NC2", i.e., TD{11, 21,12,22}, is generated.

In this case, "SC1+SC2" denotes an SC for delivering media with a specified bandwidth within a specified time, and "NC1+NC2" denotes that a network is controlled to select an optimal path and distribute a load. Thus, the SC-NC policy and charging rule processing unit 213 and the SC-NC matching processing unit 214 perform expansive processing by forming the links 311, 312, 313, and 314 from the basic unit.

When the overall transaction unit table 320 is configured by entirely expanding the trading logic combination unit, the overall trading logic structure scale and control and charging processing information 321 are formed. The overall trading logic table operates while dynamically changing from the start of the service to the end of the service, that is, in a service life cycle and a networking life cycle.

Another example of the trading control scheme between transaction partners using the trading logic table will be described.

It is assumed that an application service provider provides a streaming service that guarantees the best image quality (a media quality service capability (SC6)) in a certain time period (a time-dependent service capability (SC1)) from the standpoint of a service user 106. The application service provider requires a cloud provider that stores moving images in cloud servers 108 and 109 and supplies the moving images to trade necessary to provide the above-described service, and an NC provider trades a necessary NC.

In order to satisfy SC {SC1, SC6} for the above-described application service, the trade is made such that the network capabilities (the optimal path selection NC (NC1), the load distribution NC (NC2), and the alternative path selection NC (NC3)) are used under optimal conditions. In the basic unit 300 of the trading logic table, the service capacities {SC1 and SC6} are used as a table column, and NC {NC1, NC2, NC3} are used as a table row. A control execution link and charging unit is generated for two columns and three rows, stored in a computer memory, and looked up in a logic processing process. Here, value information for a charging unit is determined on the basis of a contract between the trading partners. The SC-NC policy and charging rule processing unit 213 electronically processes a charging rule by a trading control transaction between trading parties using the trading logic control table.

A method of performing a trading(charging) between an NC provider (A) providing an NC and an SC provider (B) performing utilization to achieve an SC according to an embodiment of the present invention will be further described below.

It is assumed that the charge of the transaction unit 301 when B requests the transaction of NC1 to realize SC1 is 10 USDUSD. That is, it is assumed that B pays 10 USDUSD to A to trade for NC1.

For example, a transaction unit 302 may be transacted at 20 USDUSD (the charge for NC2 may be higher than the charge for NC1 because of network resource control difficulty), a transaction unit 303 may be transacted at 10USDUSD (which is the same charge as the charge for the transaction unit 301 because NC1 is transacted), and a transaction unit 304 may be transacted at 20 USDUSD (which is the same charge as that of the transaction unit 302 because NC2 is transacted). That is, B and A may determine charges on the basis of NC.

In this case, when B intends to provide SC1 and SC2 as a combination service product, the charge for transacting the basic units 301, 302, 303, and 304 is 60 USD (10 USD+20 USD+10 USD+20 USD). However, when a new service product is to be created by combining SC1 and SC2, the transaction may be made using a transaction unit 310 obtained by combining the basic units. That is, A sets the transaction unit 310 as a transaction unit used for the transaction with B. In this case, for example, a total of 30 USD may be determined as an amount to be transacted by applying a discount compared to a case where the transaction units 301, 302, 303, and 304 are transacted independently.

In a real situation, there are many As and many Bs. Through this scheme, As and Bs select their partners such that both of the parties have maximum benefits. A may find a condition for providing NCs at the highest quality and reasonable price, and B may devise the best strategy to get NCs from A at the highest quality and reasonable price and to provide an SC to an application service provider. Through this process, many As and many Bs may find an optimal SC utilization mechanism that should be performed in various high risk/high reliability networking service ecosystems, which may be expressed in future services.

Figure 4:
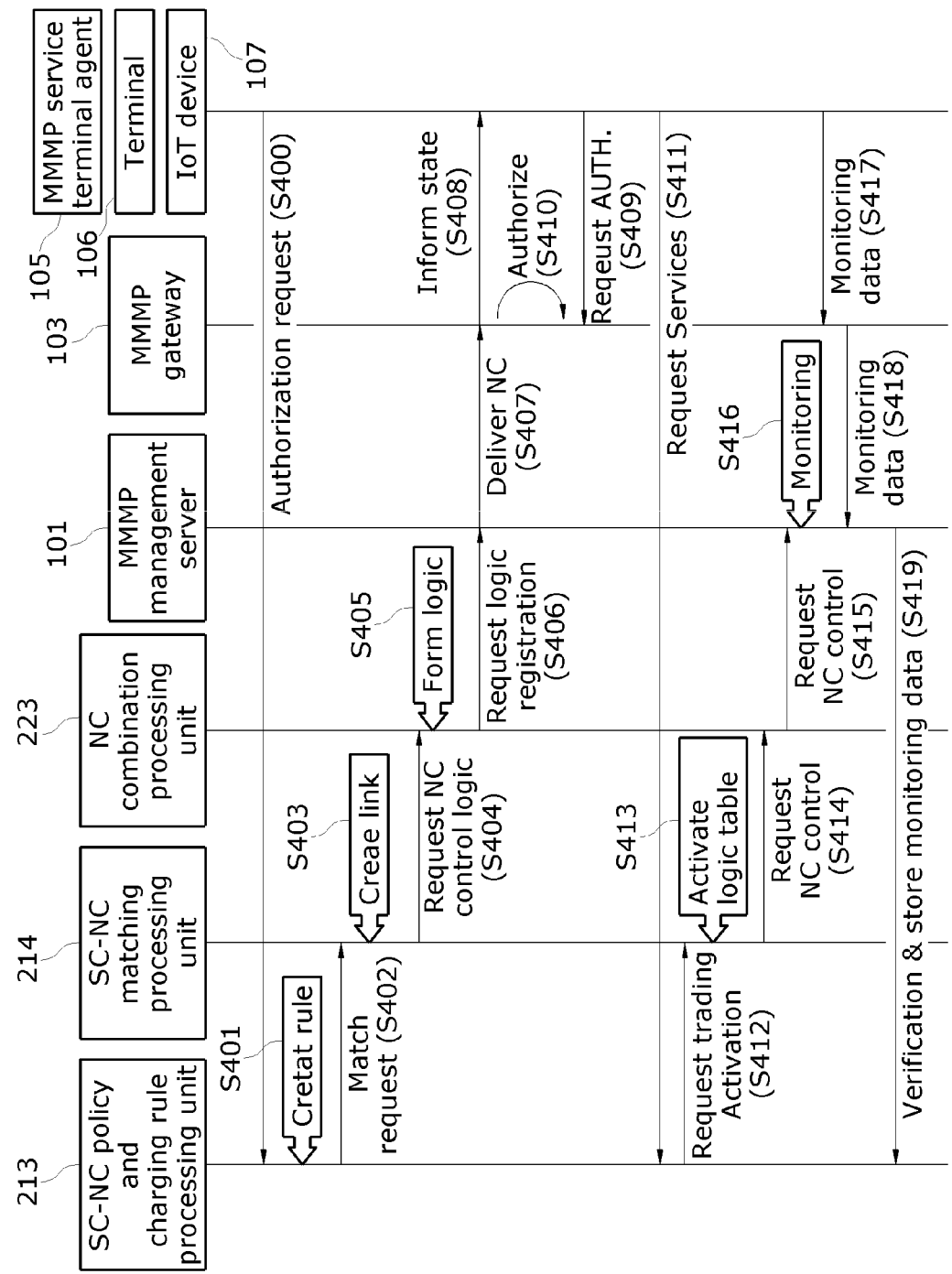
FIG. 4 shows a control processing procedure illustrating trading control procedure between unit systems when the MMMP networking management system and the SC-NC matching system operate in terminal-to-terminal group networking according to an embodiment of the present invention.

A trading control processing method for terminal-to-terminal group networking will be described in detail below with reference to FIG. 4.

The terminal-to-terminal group networking means that a specific SC is provided only to terminals belonging to a specific group and that an NC corresponding to this SC also operates only for the terminals in the group. The terminal-to-terminal group networking is to provide a special SC only to a specific application service subscriber group. For example, when a general employee in a company performs a normal task and a specific employee handles a secret task, security-specific/high-reliability networking is guaranteed only for authorized/authenticated terminal groups used by employees who treat secret tasks. Such cases will frequently exist in future hyper-networking communication service situations. In a public network, network neutrality must be observed, and thus such a case may be handled specifically for SC provision.

When the terminals 105, 106, and 107 for authorization and authentication deliver a connection authorization request to the SC-NC policy and charging rule processing unit 213 in order to form a terminal group (S400), the SC-NC policy and rule processing unit 213 creates and maintains, as a profile, SC-NC combination rule regarding which SC is to be provided to an authorized terminal group, determines a charging rule to an owner of the corresponding terminal group (S401), and then sends a request for SC-to-NC matching to be applied to the terminal group to the SC-NC matching processing unit 214 (S402).

When the request is received, the SC-NC matching processing unit 214 generates and stores a trading control link of the matching logic table presented in FIG. 3 (S403) and sends a request for an NC control logic to the NC combination processing unit 223 (S404).

When the request is received, the NC combination processing unit 223 forms a logic combination of NC control unit API communication (S405) and sends a request for NC control APIs registration to the MMMP management server 101 and registers a networking operation event (S406).

The MMMP management server 101 sets an end-to-end NC unit between terminals and delivers the end-to-end NC unit to an MMMP gateway 103 (S407), and the MMMP gateway 103 inform that connection authorization is possible for an SC and an NC corresponding to a requesting terminal (S408).

The MMMP gateway 103 waits for an arrival related to whether or not the terminal is to receive a corresponding SC (at this point, the terminal is not informed of whether the terminal is to receive a corresponding NC). When a terminal authorization request is received from an MMMP service terminal agent (S409), the MMMP gateway 103 performs the connection authorization (S410). A preparation for performing an SC corresponding to the terminal group is completed, and the state immediately ready for trading control operation.

Subsequently, the terminal sends a group service request to the SC-NC policy and rule processing unit 213 (S411).

When the SC-NC policy and charging rule processing unit 213 sends an NC trading activation request to the SC-NC matching logic processing unit 214 (S412), the SC-NC matching processing unit 214 switches the trading control link of the matching logic table to an active mode (S413) and sends an NC control request to the NC combination processing unit 223 (S414). The NC combination processing unit 223 sends an NC logic control request to the MMMP management server 101 (S415).

Subsequently, the MMMP management server 101 monitors NC processing (S416). To this end, the terminal delivers monitoring data to the MMMP management server 101 through the MMMP gateway 103 (S417, S418).

The MMMP management server 101 delivers verification-specific monitoring data conforming to a trading rule to the SC-NC policy and rule processing unit 213 (S419). Thus, the SC-NC policy and charging rule processing unit 213 stores all data used in the trading control operation and maintains post-verification data for maintenance as a history.

Figure 5:
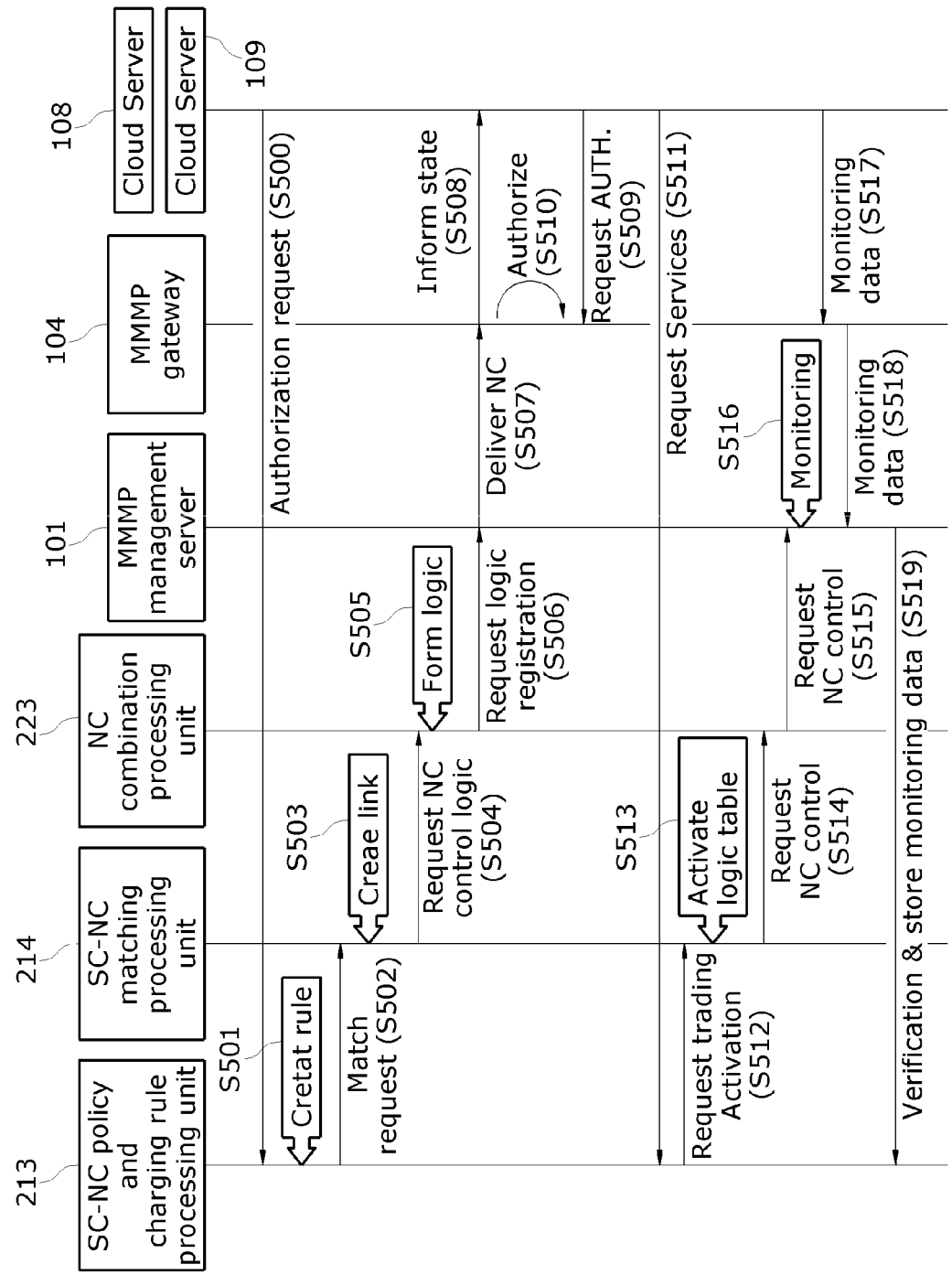
FIG. 5 shows a control processing procedure illustrating trading control procedure between unit systems when the MMMP networking management system and the SC-NC matching system operate in cloud-based networking according to an embodiment of the present invention.

A trading control processing method for cloud-based networking will be described in detail below with reference to FIG. 5.

Cloud-based networking means that a specific service, i.e., a cloud-specific SC (a service capability corresponding to a specific cloud service) is provided to a terminal specified for a specific cloud server (a specific cloud service) while a physical connection is made to the terminal in a wired or wireless manner and that an NC corresponding to the SC also operates for a service terminal to be connected to the cloud.

For example, in the case of a specific cloud application service, the service may be provided only to a terminal specified by a subscriber, or a special SC may be provided only to a subscriber group specific to the cloud application service.

For example, general subscribers in any organization do normal tasks that are always connected to the cloud, and subscribers belonging to a special group access the cloud for a certain time to do tasks with high security levels. This is a case where there is a situation for guaranteeing security or high-reliability networking only for authorized/authenticated subscriber terminal. Such a case will exist in all cloud-based control cases (finance, defense tactics, disaster control, autonomous vehicle control, smart city energy management, etc.) in future hyper-networking communication service situations.

An SC-NC trading processing flow for a cloud-based networking service will be described below.

When a connection authorization request from the cloud servers 108 and 109 to authorize and authenticate a cloud service is delivered to the SC-NC policy and charging rule processing unit 213 in order to form cloud-based networking (S500), the SC-NC policy and rule processing unit 213 creates and maintains, as a profile, an SC combination rule that is presented in FIG. 3 and regarding which SC is to be provided to an authorized connected terminal or terminal group, and determines a charging rule for an owner of the corresponding terminal group (S501). Then, the NC policy and rule processing unit 213 sends an SC-to-NC matching request to be applied to the cloud service terminal group to the SC-NC matching processing unit 214 (S502). When the request is received, the SC-NC matching processing unit 214 generates and stores a trading control link of the matching logic table presented in FIG. 3 (S503) and sends a request for an NC control logic to the NC combination processing unit 223 (S504). When the request is received, the NC combination processing unit 223 forms a logic combination of NC control unit API communication (S505) and sends a request for NC control APIs registration to the MMMP management server 101 and registers a networking operation event (S506).

The MMMP management server 101 sets an end-to-end NC unit between terminals and delivers the end-to-end NC unit to the MMMP gateway 103 (S507), and the MMMP gateway 103 inform that authorization is possible for an SC and an NC corresponding to a requesting cloud servers (S508). The MMMP gateway 103 waits for an arrival related to whether or not the cloud server is to receive a corresponding SC (at this point, the server is not informed of whether to receive a corresponding NC). When an authorization request from the cloud server (S509), the MMMP gateway 103 performs the connection authorization (S510). A preparation for performing an SC corresponding to the server is completed, and the state ready for trading control.

The requesting cloud server sends a service request for a target terminal group to the SC-NC policy and rule processing unit 213 (S511).

When the SC-NC policy and rule processing unit 213 sends an

NC trading activation request to the SC-NC matching logic processing unit 214 (S512), the SC-NC matching processing unit 214 switches the trading control link of the matching logic table to an active mode (S513) and sends an NC control request to the NC combination processing unit 223 (S514). The NC combination processing unit 223 sends an NC logic APIs control request to the MMMP management server 101 (S515).

Subsequently, the MMMP management server 101 monitors an SC corresponding to networking monitoring (S516), and the cloud server delivers monitoring data to the MMMP management server 101 through the MMMP gateway 103 (S517, S518).

The MMMP management server 101 delivers verification-specific monitoring data conforming a trading rule to the SC-NC policy and rule processing unit 213 (S519). Thus, the SC-NC policy and charging rule processing unit 213 stores all data used in the trading control operation and maintains post-verification data for maintenance as a history.

According to the present invention, it is possible to perform network control that allows a user to determine a network level on the basis of an NC (bandwidth, stability, security, etc.) in the range from various future hyper-networking wired and wireless terminals (including an IoT terminal) to a cloud server.

In addition, by allowing multiple NC control and re-defining service requirements for each SC unit, it is possible for a cloud service provider, an application-specific service provider for providing a service, and the like to control and then use an NC on the basis of an SC unit, and thus it is also possible to diversify the supply of services in hyper-networking environments.

Also, by presenting an NC processing apparatus technique, it is possible to quickly control an NC when a service is provided in real-time.

The resulting service effects for each application field will be summarized as follows.

(1) Real-time Service Application Fields: promotion of utilization of a reliable service with hyper-networking for energy/safety management control according to time-period-specific environmental changes in the smart city field, a defense strategy networking service in the defense field in which a strategic situation changes every moment, a national disaster control service including symptom detection before a disaster or follow-up actions, and a telemedicine diagnosis service (2) Multimedia Quality Service Control Application Field: secure delivery of services such as collection, sharing, and distribution of multimedia data (e.g., a surveillance networking service using closed-circuit television (CCTV) media, a telemedicine diagnosis services, a defense terrain navigation service, etc.) with optimal media quality and transport cost (3) Location-Based Service Application Field: provision of a corresponding SC to only a specific regional group (e.g., a service for providing a specific service capability between terminals present in a specific region)

Meanwhile, the effects on future changes in the business ecosystem, where net neutrality and differentiation have to be compatible in the information and communication field, are as follows.

(1) By introducing an NC trading concept among a network infrastructure provider, a cloud service provider, and an application service provider, which are in a hierarchical ecosystem in the information and communication field, it is possible to allow services to be diversified and allow new SCs to be created. Also, by transacting NCs in a subdivided control unit, it is possible to promote usage utilization.

(2) The scheme according to the present invention provides a transaction criterion corresponding to the difficulty of NC control matched in addition to a proper compensation standard corresponding to the difficult of SC execution, thereby exerting an effect in terms of a policy of preparing a value assignment environment corresponding to overall network advancement.

(3) A common trading interface is defined among service users, SC providers, and NC providers, and thus it is possible to construct an environment that can cooperatively cope with SC management and network maintenance (failure, performance, security, etc.).

In summary, in the next-generation hyper-networking IoT network, by developing one or more unit SCs to be used in each application service, providing several combinations of unit SCs to users, and matching the combinations to the NC of a network provider, it is possible to control an MMMP network, and thus it is possible to allow the users to receive various high-quality services.

The present invention has been described in detail with reference to some preferred embodiments, but the above description of the present invention is merely an example. Those skilled in the art would understand that the present invention may be easily embodied in many different forms without changing the technical spirit or essential features thereof. The above embodiments are, accordingly, to be regarded as illustrative rather than restrictive.

The scope of the present invention is shown by the following claims rather than the foregoing detailed description, and all changes or modifications derived from the meaning and scope of the claims and their equivalents should be construed as being included in the scope of the present invention.

What is claimed is:

1. A matching system that sends a network control instruction to a Multi-Media Multi-Path (MMMP) networking management system for managing heterogeneous networks in an integrated manner and that associates multiple service capabilities (SCs) to multiple network capabilities (NCs), the matching system comprising:
a policy and rule processing unit configured to extract SC units for each application service required, combine the SC units, configure a transaction unit, and determine an amount to be charged for a transaction according to a charging rule;
a matching processing unit configured to match the extracted SC units to NC units;

an NC combination processing unit configured to combine the NC units used for the matching and deliver the combination of the NC units and detailed operating conditions to the MMMP networking management system; and a trading matching database configured to match the SCs to the NCs and store a transaction unit table for which a transaction unit is set;

wherein the transaction unit includes one of:

a basic transaction unit in which one SC and one NC are matched on a one-to-one basis;

a multi-transaction unit which includes links of two or more basic transaction units and in which multiple SCs and multiple NCs are matched; and an overall transaction unit which includes two or more multi-transaction units.

2. The matching system of claim 1, wherein the policy and rule processing unit analyzes a required application service and extracts at least one of a time-dependent SC (SC1), a bandwidth-dependent SC (SC2), a safe delivery SC (SC3), a zone-dependent SC (SC4), a group SC (SC5), and a media quality SC (SC6).

3. The matching system of claim 1, where the policy and rule processing unit adds the SC units by adding a new SC to pre-defined SCs.

4. The matching system of claim 1, wherein the matching processing unit matches at least one of an optimal path selection NC (NC1), a load distribution NC (NC2), an alternative path selection NC (NC3), a security-specific multi-media distribution and delivery NC (NC4), and a policy-specified NC (NC5) to each of the extracted SC units.

5. The matching system of claim 1, wherein the MMMP networking management system comprises:

an MMMP agent apparatus configured to perform network control on behalf of a wired/wireless terminal, an Internet of Things (IoT) terminal, and application-area-specific networking belonging to homogeneous applications; and an MMMP management server configured to receive a network operating condition from an NC management server through an application program interface (API) communication scheme, control a terminal-side gateway through a control channel to control a network operation between a terminal side and a server side, and control a server-side gateway through a control channel, a backup gateway, and a backup control channel.

6. A network operation method in a network infrastructure including two or more heterogeneous networks, the network operation method comprising:

extracting service capability (SC) associated to multiple network capabilities (NCs), units for each application service required;

matching NCs required for SCs to the SCs; and generating a transaction unit in which the SCs and the NCs are matched;

wherein the generating of the transaction unit comprises:

matching the SCs and the NCs on a one-to-one basis; and generating transaction information for an NC transaction; and wherein the generating of the transaction unit further comprises generating a multi-transaction unit which includes links of two or more basic transaction units and in which multiple SCs and multiple NCs are matched.

7. The network operation method of claim 6, wherein the transaction information includes a requestor (A) of an SC, an owner (B) of an NC, a charge for NC use, an operation start time and an operation end time of an NC, and a transaction operation stop flag.

8. The network operation method of claim 6, wherein the generating of the transaction unit comprises:

generating transaction information for the overall transaction unit; and adjusting a basic transaction unit according to the transaction information for the overall transaction unit.

9. The network operation method of claim 6, further comprising delivering a combination of NC units and detailed operating conditions to a networking management system configured to manage an MMMP network.

10. A network capability (NC) trading control method for terminal-to-terminal group networking, the NC trading control method comprising:

receiving a connection authorization request of a terminal to form a group;

requesting matching of a service capability (SC) to be applied to an authorized terminal group and a network capability (NC) corresponding to the SC;

generating a matching logic table in response to the request and delivering an NC combination and operating conditions to a networking management system; and switching a trading control link of the matching logic table to an active mode in response to a request for NC trading activation and sending an NC control request to the networking management system;

wherein the requesting of the matching comprises:

maintaining an SC combination rule to be provided as a profile;

determining a charging rule for an owner of a corresponding terminal group; and requesting matching of an SC to be applied to the terminal group and an NC corresponding to the SC after the charging rule is determined.

11. The NC trading control method of claim 10, wherein the delivering of an NC combination and operating conditions comprises:

causing an SC-NC matching processing unit to receive the request and generate and store the matching logic table including the trading control link, and sending a request for an NC control logic to an NC combination processing unit; and causing the NC combination processing unit to form a logic combination of NC control unit API communication, send a request for NC control APIs registration to an MMMP management server, and register a networking operation event.

* * * * *